(12) United States Patent
KS et al.

(10) Patent No.: US 9,916,632 B1
(45) Date of Patent: Mar. 13, 2018

(54) DATA COLLECTION AND SOFTWARE REGISTRATION DURING DESKTOP SOFTWARE INSTALLATION

(71) Applicant: Intuit Inc., Mountain View, CA (US)

(72) Inventors: Vinash KS, Karnataka (IN); Richard L. Clark, San Jose, CA (US); Soumendra Daas, Karnataka (IN)

(73) Assignee: INTUIT INC., Mountain View, CA (US)

( * ) Notice: Subject to any disclaimer, the term of this patent is extended or adjusted under 35 U.S.C. 154(b) by 742 days.

(21) Appl. No.: 14/015,269

(22) Filed: Aug. 30, 2013

(51) Int. Cl.
  *G06F 11/30* (2006.01)
  *G06Q 50/18* (2012.01)
  *G06Q 10/10* (2012.01)

(52) U.S. Cl.
  CPC ........... *G06Q 50/184* (2013.01); *G06Q 10/10* (2013.01)

(58) Field of Classification Search
  CPC .............................. G06Q 50/184; G06Q 10/10
  USPC ......................................................... 713/189
  See application file for complete search history.

(56) References Cited

U.S. PATENT DOCUMENTS

| | | | | |
|---|---|---|---|---|
| 8,924,957 | B1 * | 12/2014 | Newstadt | G06F 8/61 717/173 |
| 2003/0143990 | A1 * | 7/2003 | Minear | H04M 1/72525 455/418 |
| 2004/0123284 | A1 * | 6/2004 | Bryant | G06F 8/61 717/174 |
| 2004/0198334 | A1 * | 10/2004 | Chmaytelli | H04M 1/72525 455/419 |
| 2004/0237084 | A1 * | 11/2004 | Kurzweil | G06F 21/10 717/178 |
| 2004/0254889 | A1 * | 12/2004 | Tanaka | G06Q 30/06 705/59 |
| 2005/0246285 | A1 * | 11/2005 | Chakravarthy | H04L 67/34 705/59 |
| 2006/0253851 | A1 * | 11/2006 | Cho | G06F 9/4446 717/175 |
| 2007/0220510 | A1 * | 9/2007 | Bell | G06F 9/4446 717/174 |
| 2008/0127169 | A1 * | 5/2008 | Malasky | G06F 8/61 717/174 |

(Continued)

OTHER PUBLICATIONS http://en.wikipedia.org/wiki/Installation_(computer_programs).
http://en.wikipedia.org/wiki/Installation_(computer_programs)#Installer.
http://support.quickbooks.intuit.com/opencms/sites/default/qbsupportsite/PDFs/2012Guides/2012_Installation_and_Setup_Guide.pdf.

*Primary Examiner* — Mohammad W Reza
(74) *Attorney, Agent, or Firm* — Vista IP Law Group LLP

(57) ABSTRACT

Methods, systems, and computer program products for data collection and/or software registration during software installation. One or more embodiments involve a computer presenting a screen or interface comprising a screen to a user through a display, during a software installation process of a software program, a web form embedded into a web screen. The web screen may be installation web screen for the software installation process. In at least one embodiment, the web form allows the user to input data. One or more embodiments further involve the computer providing the data inputted by the user to the software program after the installation process is complete. In one or more embodiments, the data is user identification data, customer information data, software registration data, software configuration data, and/or answers by the user to at least one survey.

37 Claims, 22 Drawing Sheets

(56) References Cited

U.S. PATENT DOCUMENTS

2010/0070843 A1\* 3/2010 Duym .................. G06F 17/243
 715/224
2013/0125110 A1\* 5/2013 Borkowski ............... G06F 8/61
 717/174

\* cited by examiner

Intuit QuickBooks® Installer

Installing QuickBooks 2014...

Status: Writing system registry values

While QuickBooks is installing, let's take care of your registration.

Your QuickBooks user ID is usually your email address-give that a try first.

*User ID: sujas731@yopmail.com — 122

If we can't find your user ID, we'll set up a new account.

*Password: ****** — 123

[Validate]  ✓ Found — 124

Forgot your password?

Cancel intuit

* Required
? Need sign in help?

[Log In]  Skip this

Intuit QuickBooks® Installer

Installing QuickBooks 2014...

Status: Writing system registry values

Register your product and get started!

Tell us about your business

Who is the primary contact for this Intuit account?

Help us make your experience better

*NAME   sujas731
142 { *EMAIL   sujas731@yopmail.com
*PHONE   1232343552

143
Next

I'll do this later

Cancel intuit

* Required fields

Intuit respects and protects your privacy. We will not rent, sell or share your personal information with outside companies for their promotional use. Learn more

Intuit QuickBooks® Installer

Installing QuickBooks 2014...

Status: Installing Files

Cancel intuit

Register your product and get started!

Tell us about your business

Help us make your experience better

Who is the primary contact for this Intuit account?

* MY COMPANY HAS | Used | QUICKBOOKS BEFORE
* I GOT THIS COPY OF QUICKBOOKS FROM | an office supply store or website (Staples, Office Depot, a
* MY INDUSTRY IS | Agriculture, Ranching, or Fishing
* MY COMPANY HAS | 4 | FULL AND PART-TIME EMPLOYEES ON PAYROLL
WE | Don't use | A PAYROLL SERVICE OR PAYROLL SOFTWARE
WE | Accept | CREDIT CARDS
WE | Print | CHECKS.

152

153

Back | Register QuickBooks | I'll do this later

150

* Required fields

Intuit respects and protects your privacy. We will not rent, sell or share your personal information with outside companies for their promotional use. Learn more

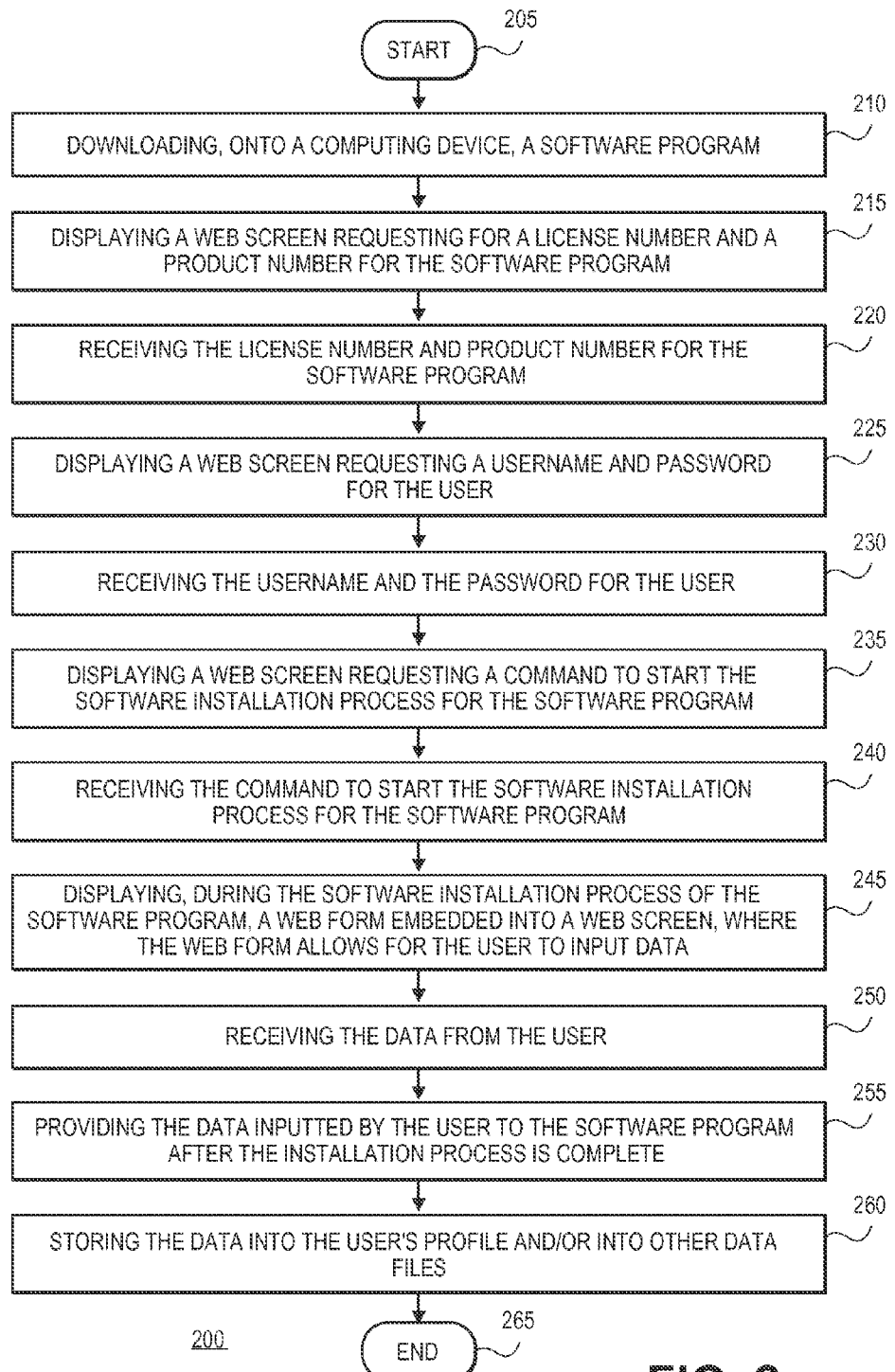

FIG. 3E

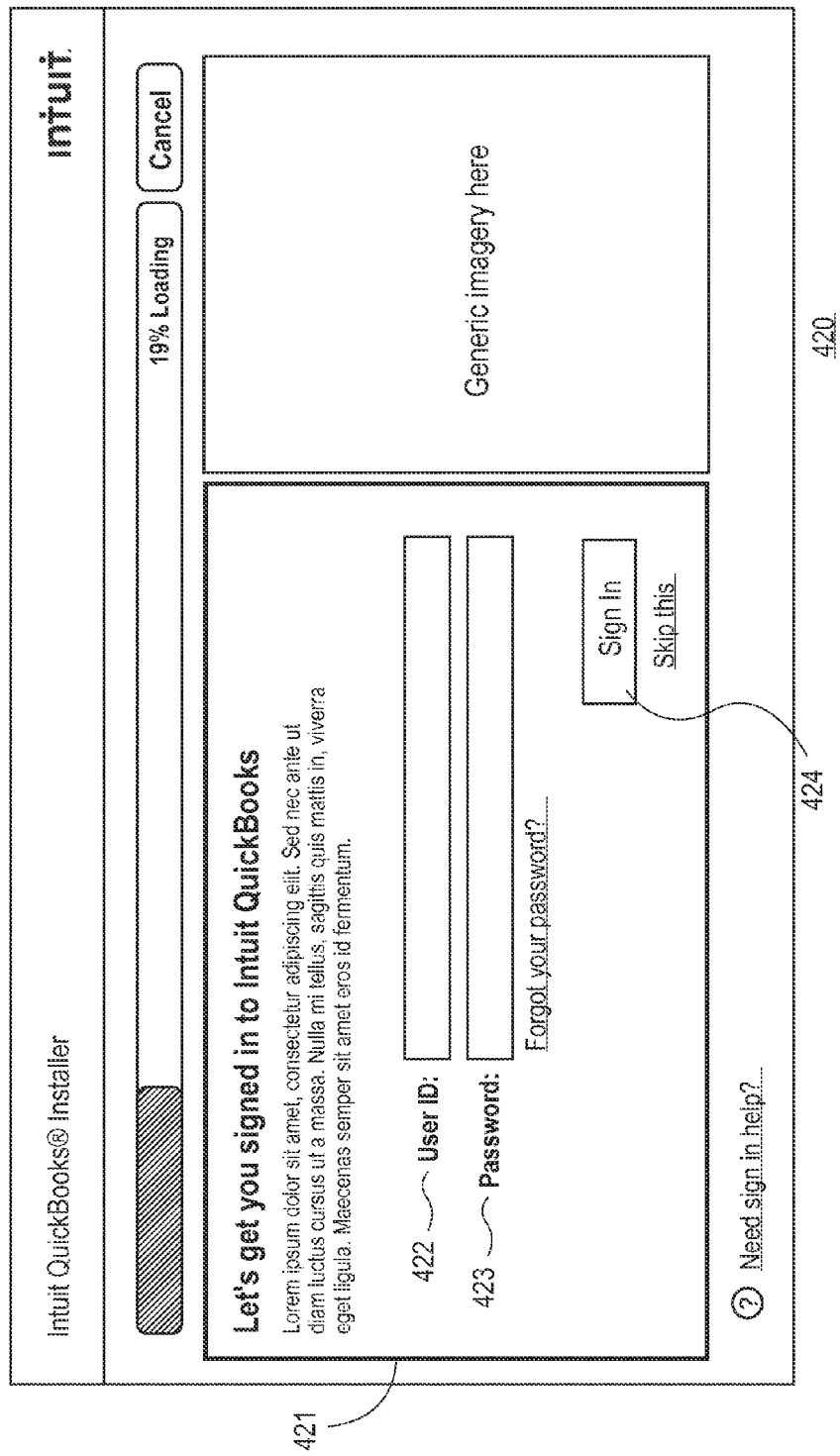

Intuit QuickBooks® Installer

19% Loading    Cancel intuit

While QuickBooks is installing... let's register your product and activate your Intuit account!

Tell us about your business

Who is the primary contact for this Intuit account?

* Business Name: [                    ]

* Address: [Street Address                    ]
[Apt, Suite, Bldg (optional)]
[ZIP]  [Enter ZIP for city and state]
[United States ▼]

* Phone: [                    ]

[Next]

Finish Later

442

* Required fields

Intuit respects and protects your privacy. We will not rent, sell or share your personal information with outside companies for their promotional use. Learn more

DATA COLLECTION AND SOFTWARE REGISTRATION DURING DESKTOP SOFTWARE INSTALLATION

FIELD

Embodiments of the invention relate to data collection and software registration.

BACKGROUND

Known software installation programs execute in a particular manner such that the user is unable to input data into the software program or to register the software program during the software installation process. Software registration is a time consuming process.

SUMMARY

Embodiments relate to data collection and/or software registration during desktop software installation.

Certain embodiments relate to computer-implemented methods for data collection and/or software registration during desktop software installation. A method according to one embodiment involves a computer presenting to the user and through a display, a page, screen or interface comprising a screen including a web form embedded into a web screen, during a software installation process of a software program, where the web form allows for the user to input data. The method further involves the computer providing the data inputted by the user to the software program after the installation process is complete. In one or more embodiments, the method further involves storing, by the software program, the data into the user's profile (e.g., a user's online profile) and/or stores the data into other data files onto the computer or onto a different computer or server.

In one or more embodiments, the web screen is an installation web screen for the software installation process. In at least one embodiment, the method further involves downloading, onto the computing device, the software program (which may include the installation program and may include the program for data collection/software registration during the installation process), the installation program (which may include the program for data collection/software registration during the installation process and may include the software program), and/or the program for data collection/software registration during the installation process.

In at least one embodiment, an installation program, when executed, performs the installation process for the software program and generates the installation web screen for the installation process. In one or more embodiments, a program for data collection and/or software registration during the installation process, when executed, generates the web form embedded into installation web screen. It should be noted that the software program, the installation program, and/or the program for data collection and/or software registration during the installation process may each be a stand alone application, which may contain one or more programs, or may be part of another system or program.

In one or more embodiments, the web screen is an installation web screen for the software installation process. In at least one embodiment, the method further involves downloading, onto the computer, the software program.

In at least one embodiment, the method further involves the computer presenting, through the display, the page, screen or interface comprising the screen including a web form embedded into a web screen requesting for a license number for the software program and/or a product number for the software program. In some embodiments, the method further involves receiving, by the computer from the user, the license number for the software program. In one or more embodiments, the method further involves receiving, by the computer from the user, the product number for the software program.

In one or more embodiments, the method further involves the computer presenting through the display the page, screen or the interface comprising the screen including the web screen requesting a username and/or password for the user. In some embodiments, the method further involves receiving, by the computer from the user, the username and/or the password for the user.

In at least one embodiment, the method further involves the computer presenting through the display the page, screen or the interface comprising the screen including the web screen requesting a command to start the software installation process for the software program. In some embodiments, the method further involves receiving, by the computer from the user, the command to start the software installation process for the software program.

In one or more embodiments, the data is user identification data, customer information data, software registration data, software configuration data, and/or answers by the user to at least one survey. In some embodiments, the computer is a desktop computer, a laptop computer, a tablet, or a smartphone.

In at least one embodiment, a computer program product comprising a non-transitory computer readable storage medium embodying one or more instructions executable by a computing device to perform a process for at least one of data collection and software registration during software installation is disclosed. The process involves a computing device presenting a page, screen or interface comprising a screen to a user through a display, during a software installation process of a software program, a web form embedded into a web screen. In one or more embodiments, the web form allows the user to input data. The process further involves providing the data inputted by the user to the software program after the installation process is complete.

In one or more embodiments, the web screen is an installation web screen for the software installation process. In some embodiments, the process further comprises downloading, onto the computing device, the software program.

In at least one embodiment, the process further comprises the computing device presenting through the display, the page, screen or the interface comprising the screen including the web screen requesting for a license number for the software program and/or a product number for the software program. In some embodiments, the process further involves receiving, by the computing device from the user, the license number for the software program. In at least one embodiment, the process further involves receiving, by the computing device from the user, the product number for the software program.

In one or more embodiments, the process further involves the computing device presenting through the display, the page, screen or the interface comprising the screen including the web screen requesting a username and/or password for the user. In some embodiments, the process further involves receiving, by the computing device from the user, the username and/or the password for the user.

In at least one embodiment, the process further involves the computing device presenting through the display, the page, screen or the interface comprising the screen including the web screen requesting a command to start the software installation process for the software program. In some embodiments, the process further involves receiving, by the computing device from the user, the command to start the software installation process for the software program.

In one or more embodiments, the data is user identification data, customer information data, software registration data, software configuration data, and/or answers by the user to at least one survey. In some embodiments, the computing device is a desktop computer, a laptop computer, a tablet, or a smartphone.

In at least one embodiment, a system for at least one of data collection and software registration during software installation is disclosed. In one or more embodiments, the system involves a computing device including a display. The system further involves an installation program executed by the computing device to install a software program onto the computing device. In one or more embodiments, during the execution of the installation program, the computing device is to present a page, screen or interface comprising a screen to a user through the display a web form embedded into a web screen, where the web form allows for the user to input data. In at least one embodiment, the computing device is to provide the data inputted by the user to the software program, after the execution of the installation program is complete.

In one or more embodiments, the web screen is an installation web screen for the installation program. In some embodiments, the computing device is further to download the software program, the installation program, and/or the program for data collection/software registration during the installation process onto the computing device.

In at least one embodiment, the computing device is further to present the screen or the interface comprising the screen to the user through the display the web screen requesting for a license number for the software program and/or a product number for the software program. In one or more embodiments, the computing device is further to receive from the user the license number for the software program. In some embodiments, the computing device is further to receive from the user the product number for the software program.

In one or more embodiments, the computing device is further to present the screen or the interface comprising the screen to the user through the display the web screen requesting a username and/or password for the user. In some embodiments, the computing device is further to receive from the user the username and/or the password for the user.

In at least one embodiment, the computing device is further to present the screen or the interface comprising the screen to the user through the display the web screen requesting a command to start the execution of the installation program. In one or more embodiments, the computing device is further to receive from the user the command to start the execution of the installation program.

In one or more embodiments, the data is user identification data, customer information data, software registration data, software configuration data, and/or answers by the user to at least one survey. In some embodiments, the computing device is a desktop computer, a laptop computer, a tablet, and/or a smart phone.

The features, functions, and advantages can be achieved independently in various embodiments or may be combined in yet other embodiments.

BRIEF DESCRIPTION OF THE DRAWINGS

These and other features, aspects, and advantages of the present disclosure will become better understood with regard to the following description and accompanying drawings wherein:

Figure 1D:
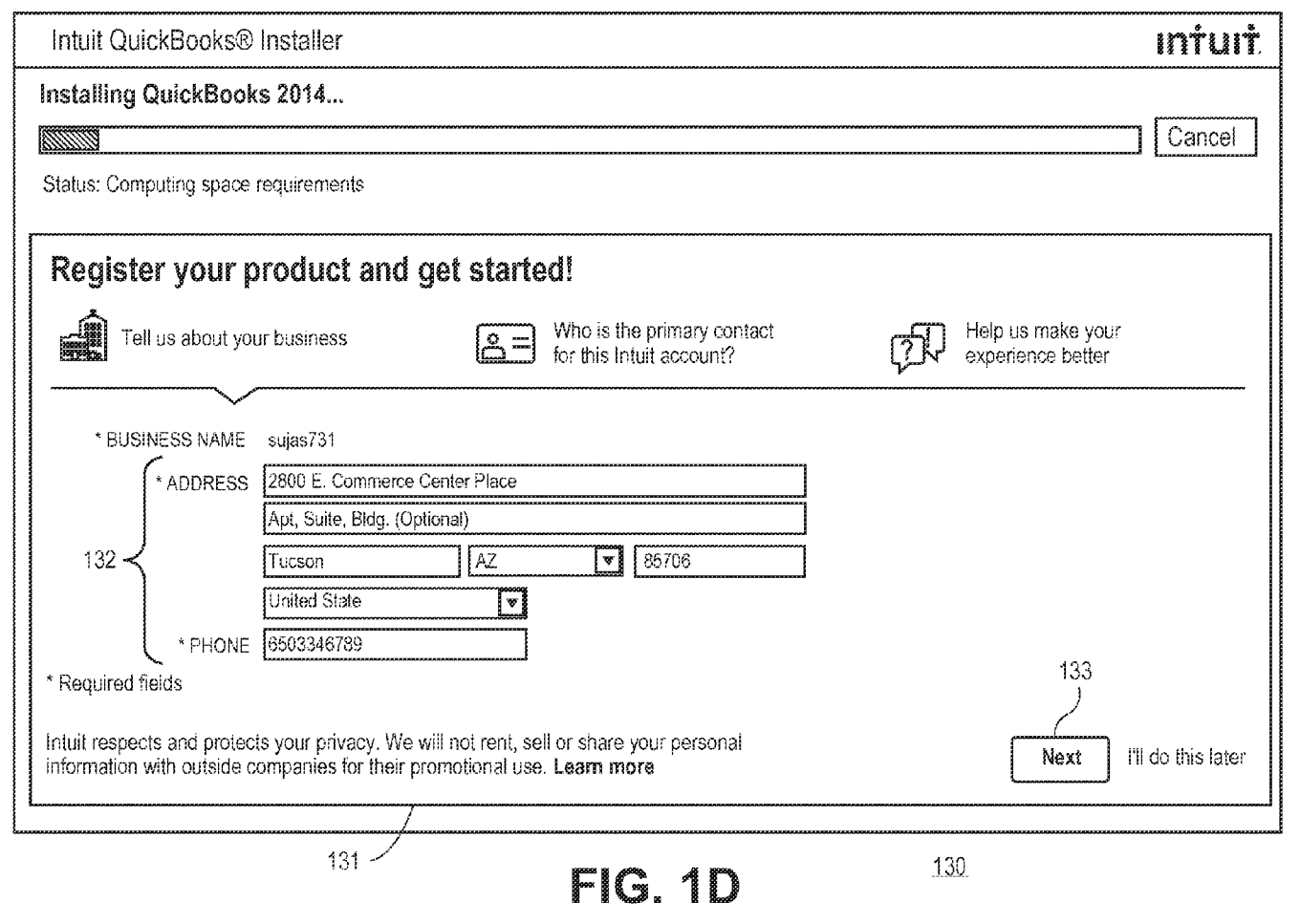

FIGS. 1A-1G show a sequence of seven exemplary screen shots for the disclosed system and method for data collection and/or software registration during desktop software installation, in accordance with at least one embodiment.

FIG. 2 is a flow diagram for the disclosed method for data collection and/or software registration during desktop software installation, in accordance with at least one embodiment.

FIGS. 3A-3F show a sequence of six exemplary screen shots for the disclosed system and method for data collection and/or software registration during desktop software installation, where the software license number is associated with multiple internal account management (IAM) numbers, in accordance with at least one embodiment.

FIGS. 4A-4F show a sequence of six exemplary screen shots for the disclosed system and method for data collection and/or software registration during desktop software installation, where the IAM number is associated with multiple customer account numbers (CANs), in accordance with at least one embodiment.

DETAILED DESCRIPTION OF ILLUSTRATED EMBODIMENTS

Figure 1A:
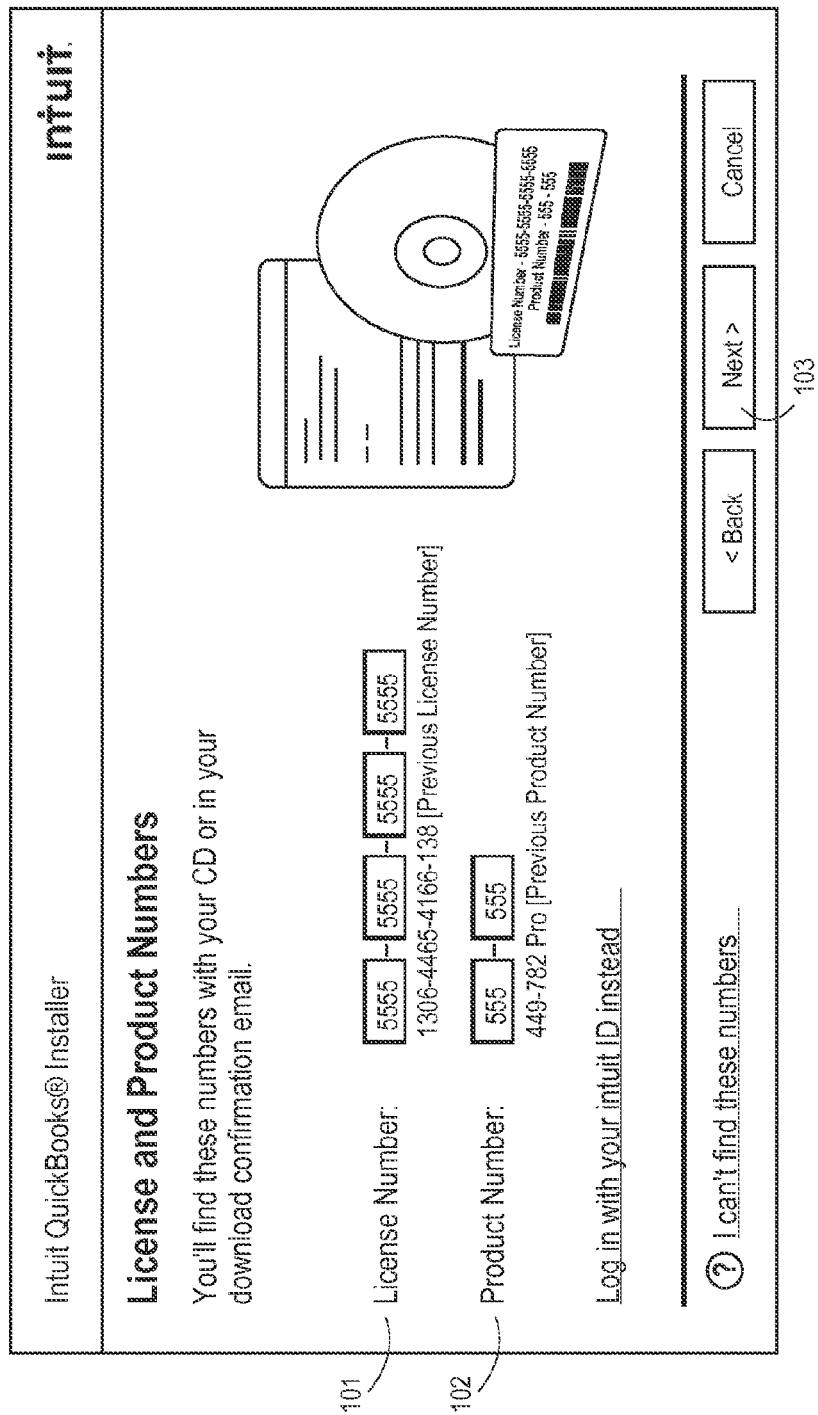
Figure 1B:
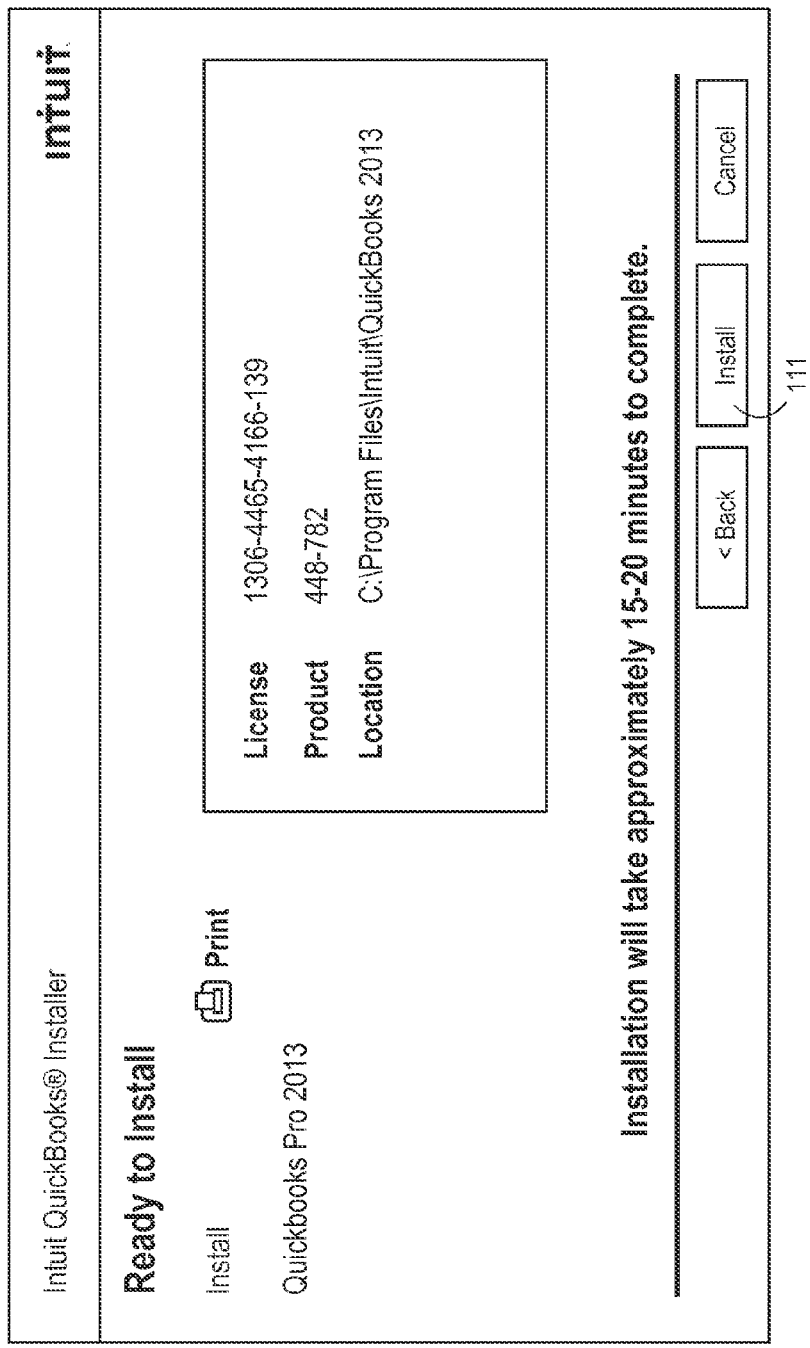

Specific embodiments will now be described in detail with reference to the accompanying figures. Like elements in the various figures are denoted by like reference numerals for consistency.

Certain embodiments relate to computer-implemented methods for data collection and/or software registration during desktop software installation. The methods disclosed herein provide an operative system for data collection and/or software registration during desktop software installation. Specifically, the disclosed system allows for, after the user passes an installation confirmation web screen, a web form to be embedded within an installer web screen. The web form allows the user to input data while the software installation process is in progress. Various different types of data may be inputted into the web form by the user including, but not limited to, user identification data, customer information data, software registration data, software configuration data, as well as the user's answers to a survey. After the software installation process is complete, the information entered by the user into the web form is saved to the user's online profile and/or imported to other data files.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide systems, methods, and computer program products for data collection and/or software registration during desktop software installation.

FIGS. 1A-1G show one manner in which embodiments may be implemented and show a sequence of seven exemplary screen shots (100, 110, 120, 130, 140, 150, and 160) for the disclosed system and method for data collection and/or software registration during desktop software installation, in accordance with at least one embodiment. In FIG. 1A, a web screen (i.e. screen shot (100)) is shown to first prompt the user to enter the software license number 101 and the software product number 102 for the software program to be installed onto the user's computer. After the user enters the software license number 101 and the software product number 102 and selects, clicks or presses the "next" button 103, a web screen (i.e. screen shot (110) of FIG. 1B) prompts the user to push the "install" confirmation button 111 to begin the installation of the software program onto the user's computer.

After the user selects, clicks or pushes the "install" confirmation button 111, the software installation process begins and a web form 121 embedded within the installer web screen (i.e. screen shot (120) of FIG. 1C) prompts the user to enter their user identification (ID) 122 and their associated password 123. After the user enters their user ID 122 and their password 123 and selects, clicks or pushes the "validate" button 124, a web form 131 embedded within the installer web screen (i.e. screen shot (130) of FIG. 1D) prompts the user to enter various data 132, relating to the business' address, required to register the software program.

After the user enters the data 132 and selects, clicks or pushes the "next" button 133, a web form 141 embedded within the installer web screen (i.e. screen shot (140) of FIG. 1E) prompts the user to enter various data 142, relating to the user's (or business') email and phone number, required to register the software program. Then, after the user enters the data 142 and selects, clicks or pushes the "next" button 143, a web form 151 embedded within the installer web screen (i.e. screen shot (150) of FIG. 1F) prompts the user to enter various data 152, relating to information about the business, required to register the software program.

Figure 1G:
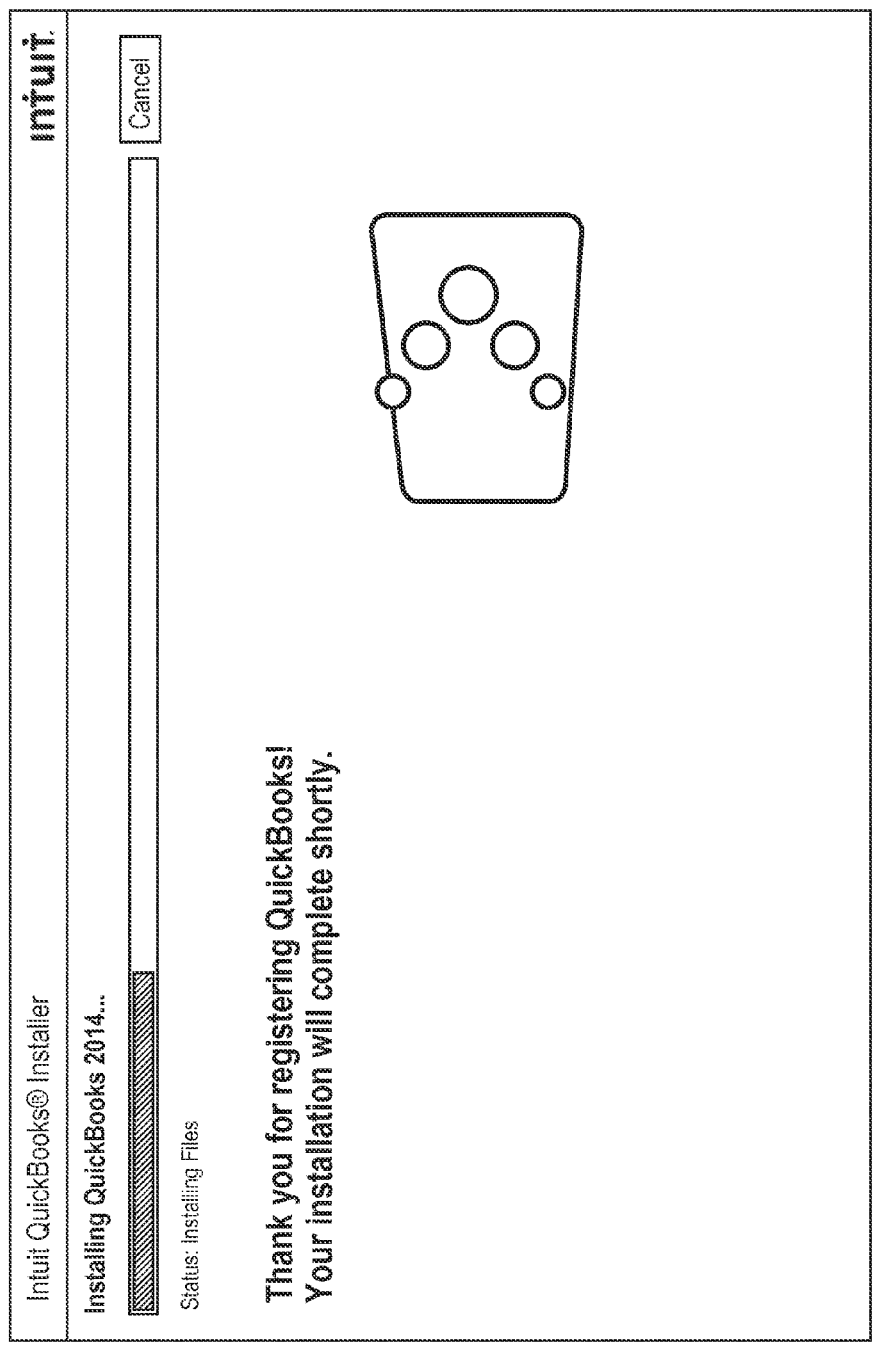

After the user enters the data 152 and selects or pushes a button for registration, such as the "Register QuickBooks" button 153, and the registration process is completed and the installation process continues (i.e. screen shot (160) of FIG. 1G) until it is completed. After the installation process has completed, the registration data 132, 142, 152 the user entered during the installation process is saved to the user's online profile and/or imported to other data files.

It should be noted that in some embodiments, a division between the web screens and the web forms is visible. In alternative embodiments of the present disclosure, the web forms appear within the web screens seamlessly.

FIG. 2 is a flow diagram of a method 200 for data collection and/or software registration during desktop software installation, in accordance with at least one embodiment. At the start of the method 200, a software program is downloaded onto a computing device 210. Then, the computing device displays a web screen for the installation process requesting a license number and a product number for the software program 215. The computing device then receives from the user the license number and the product number for the software program 220. Then, the computing device displays a web screen requesting a username and password from the user 225. The computing device receives from the user the username and password for the user 230. Then, the computing device displays a web screen requesting a command to start the software installation process for the software program 235. The computing device receives from the user the command to start the software installation process for the software program 240.

During the software installation process of the software program, the computing device displays a web form embedded into the web screen, where the web form allows for the user to input data 245. The data may be user identification data, customer information data, software registration data, software configuration data, and/or answers by the user to at least one survey. Then, the computing device receives the data from the user 250. After the installation process is complete, the computing device then provides the data inputted by the user to the software program 255. The software program then stores the data into the user's profile (e.g., the user's online profile) and/or into other data files 260. Then, the method 200 ends 265.

Figure 3A:
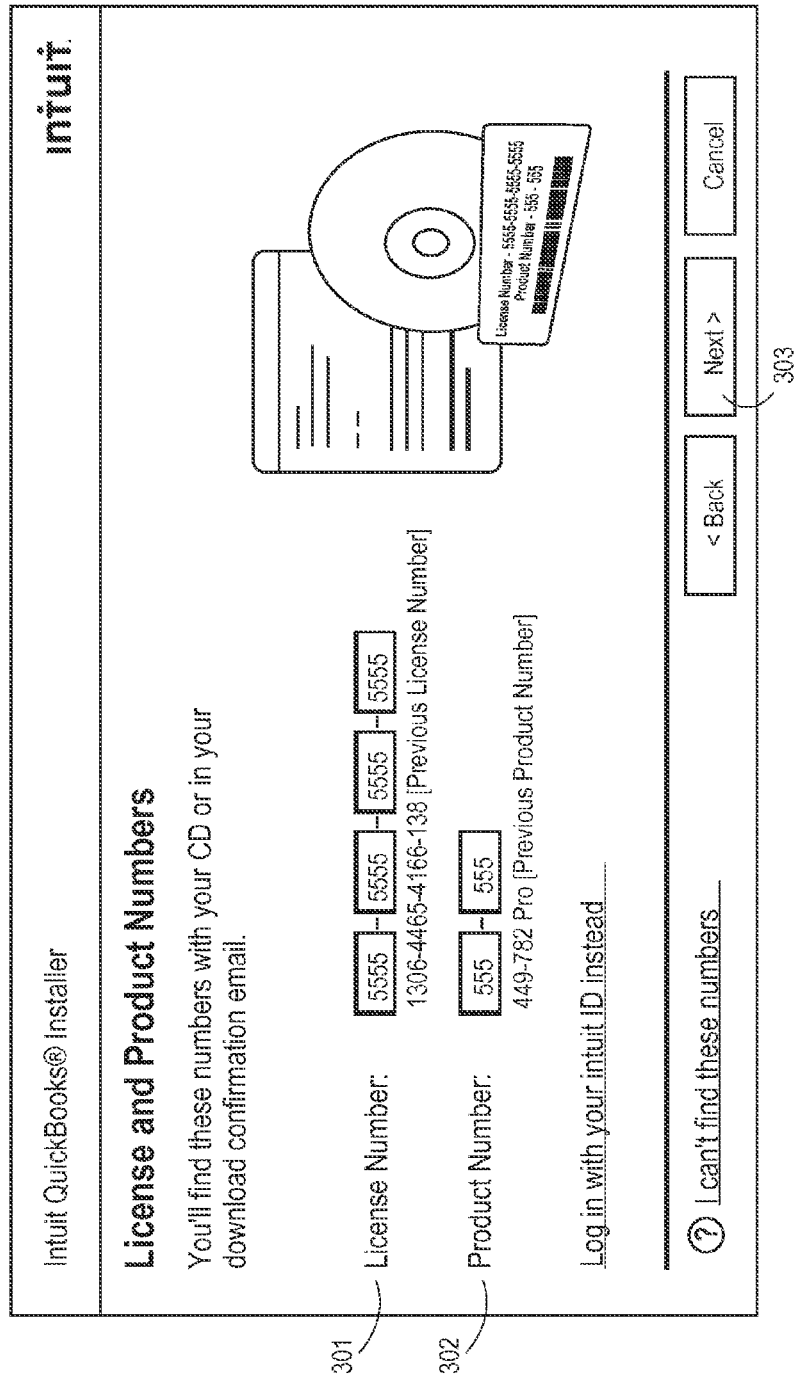
Figure 3B:
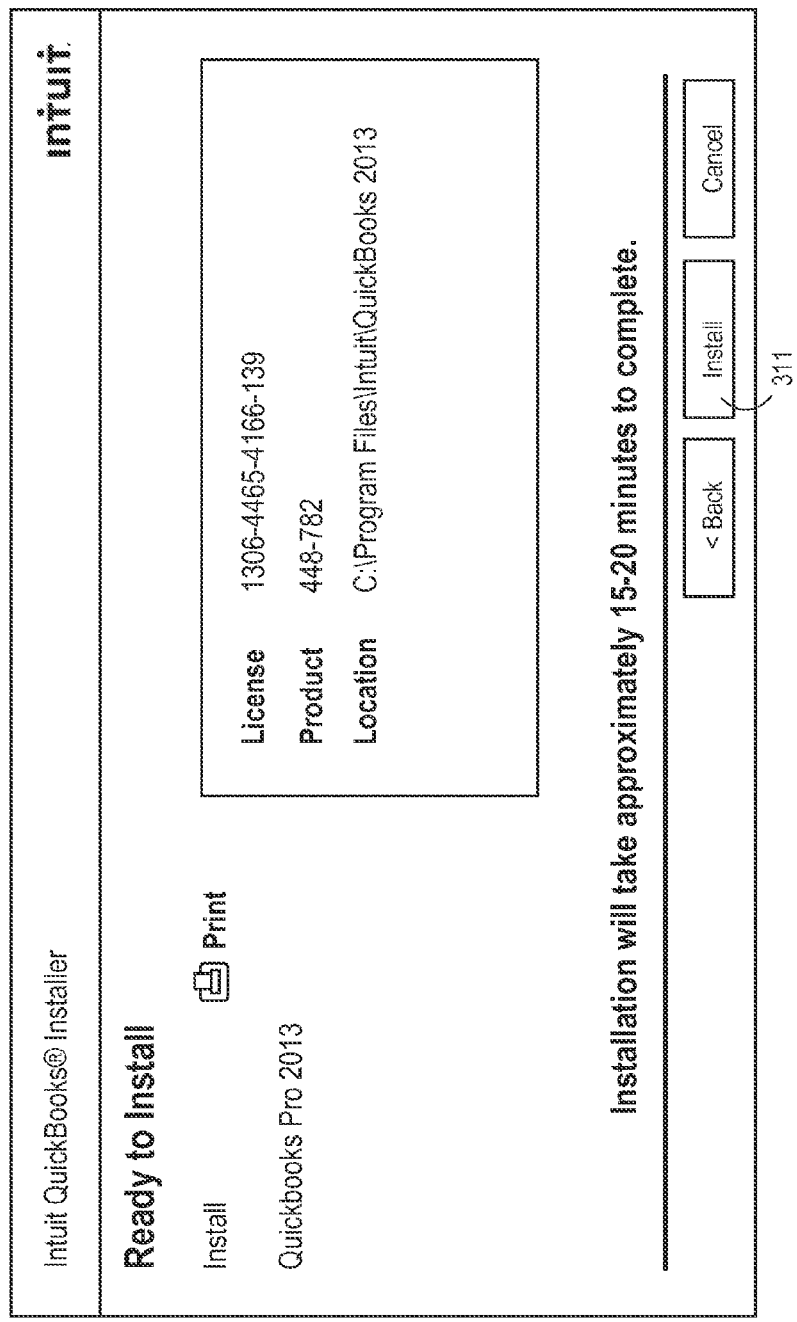

FIGS. 3A-3F show another manner in which embodiments may be implemented and show a sequence of six exemplary screen shots (300, 310, 320, 330, 340, and 350) for the disclosed system and method for data collection and/or software registration during desktop software installation, where the software license number is associated with multiple internal account management (IAM) numbers, in accordance with at least one embodiment. In FIG. 3A, a web screen (i.e. screen shot (300)) is shown to first prompt the user to enter the software license number 301 and the software product number 302 for the software program to be installed onto the user's computer. After the user enters the software license number 301 and the software product number 302 and presses the "next" button 303, a web screen (i.e. screen shot (310) of FIG. 3B) prompts the user to push the "install" confirmation button 311 to begin the installation of the software program onto the user's computer.

Figure 3C:
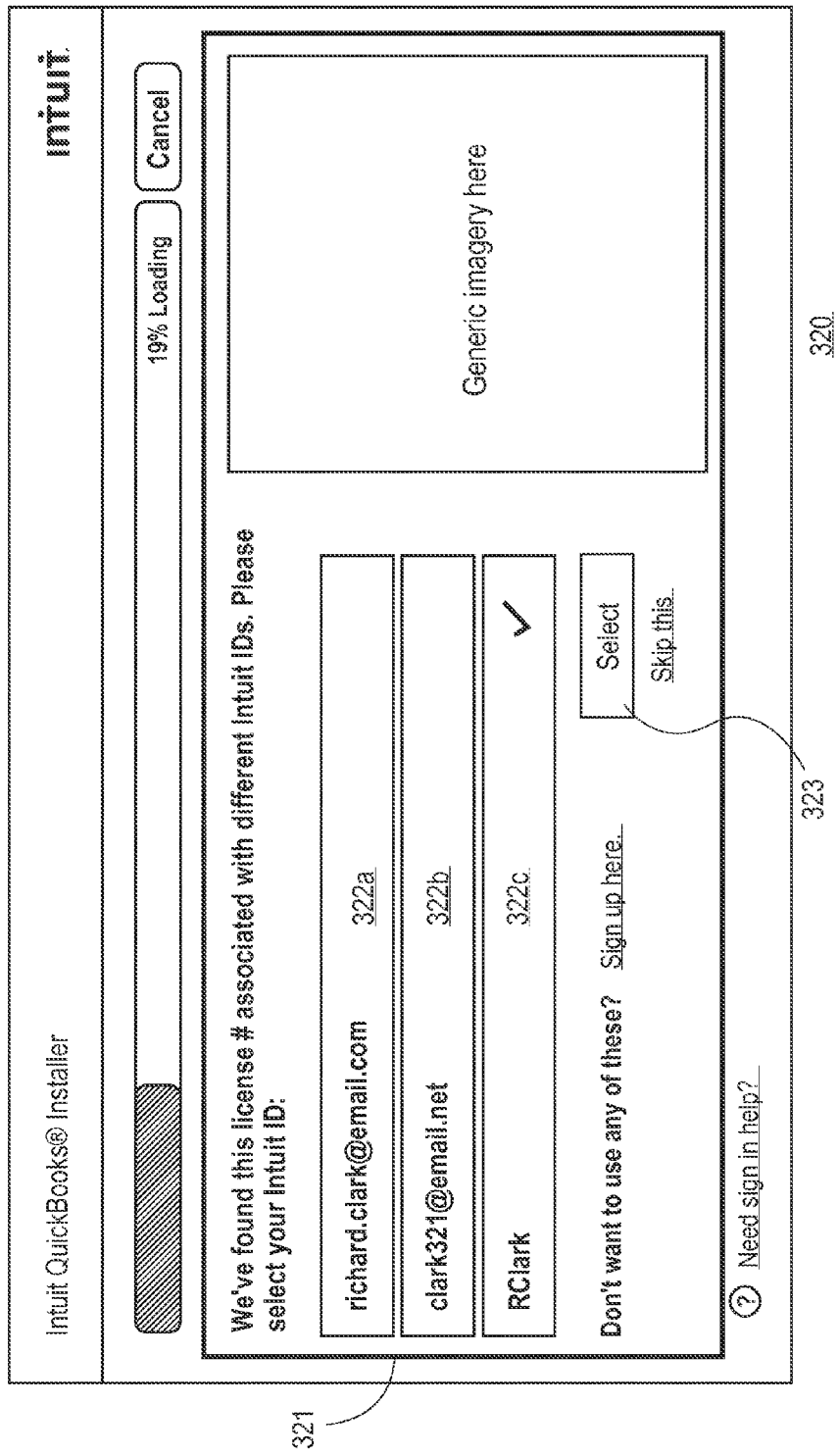
Figure 3D:
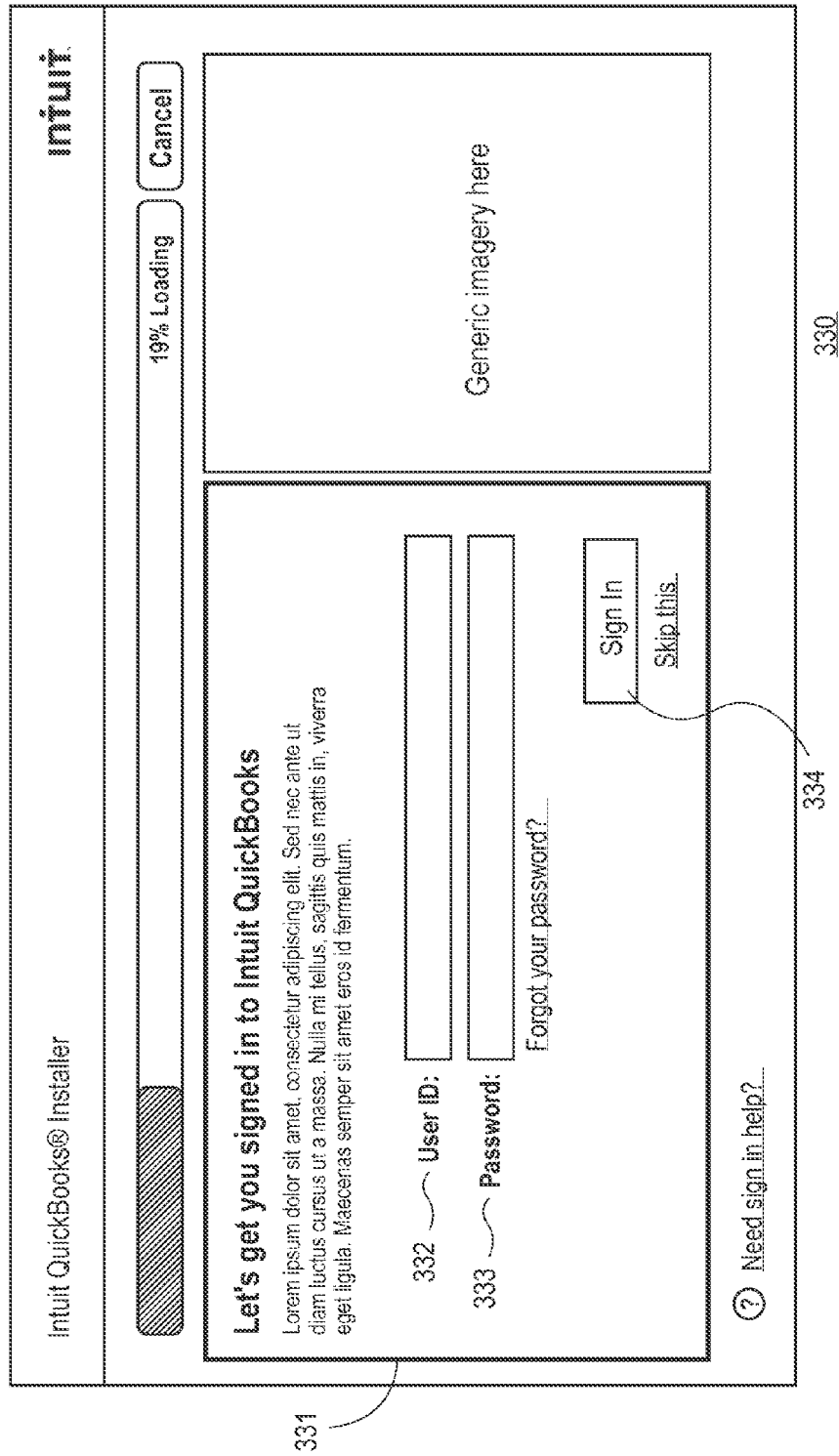
Figure 3E:
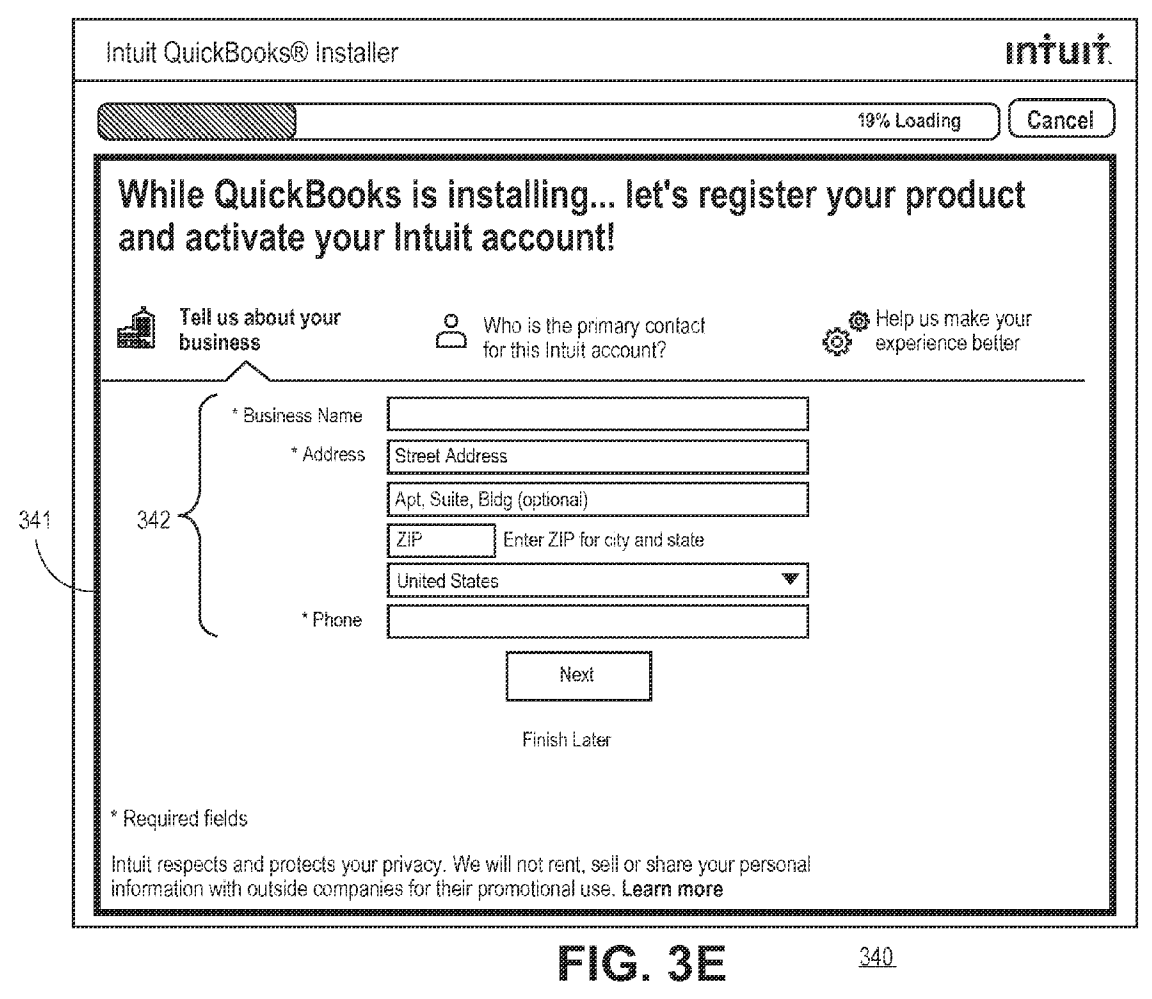
Figure 3F:
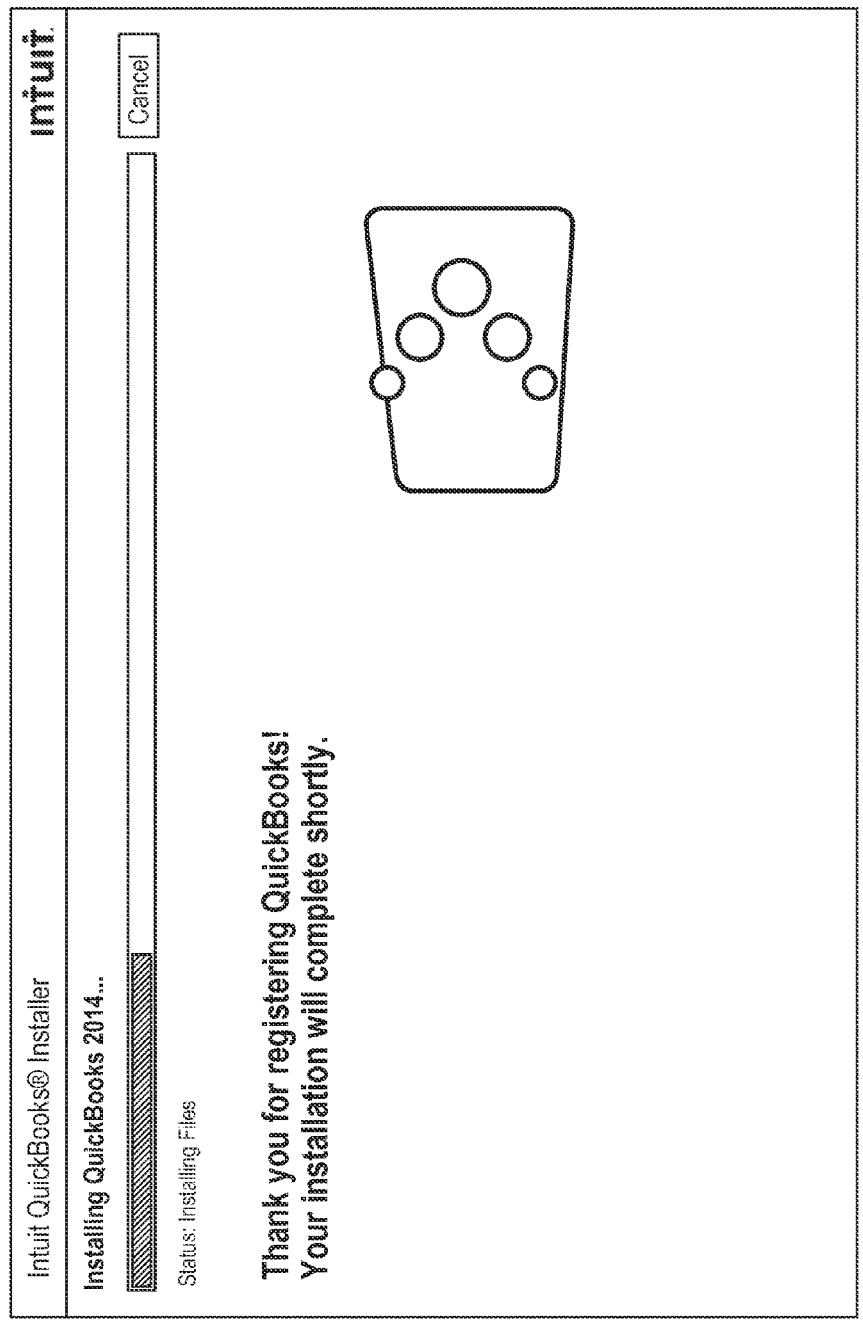

After the user pushes the "install" confirmation button 311, the software installation process begins and a web form 321 embedded within the installer web screen (i.e. screen shot (320) of FIG. 3C) prompts the user to select one IAM number 322 to use from a listing of multiple IAM numbers 322a, 322b, 322c that are associated with the software license number 301. Once the user selects the IAM number 322c to use and presses the "select" button 323, a web form 331 embedded within the installer web screen (i.e. screen shot (330) of FIG. 3D) prompts the user to enter their user identification (ID) 332 and their associated password 333.

After the user enters their user ID 332 and their password 333 and pushes the "sign in" button 334, a web form 341 embedded within the installer web screen (i.e. screen shot (340) of FIG. 3E) prompts the user to enter various data 342 required to register the software program. After the registration process is complete, the installation process continues (i.e. screen shot (350) of FIG. 3F) until it is complete. After the installation process is complete, the registration data 342 the user entered during the installation process is saved to the user's online profile and/or imported to other data files.

Figure 4A:
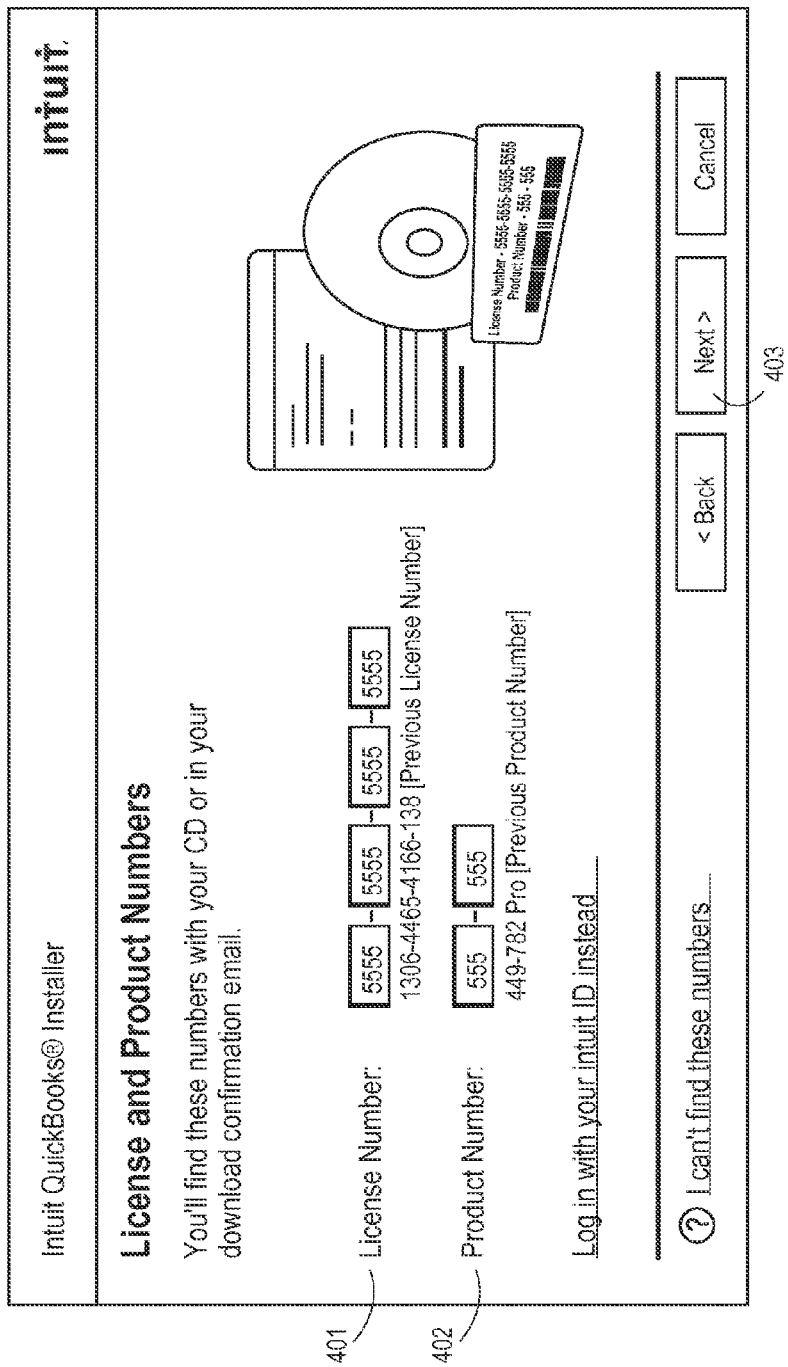
Figure 4B:
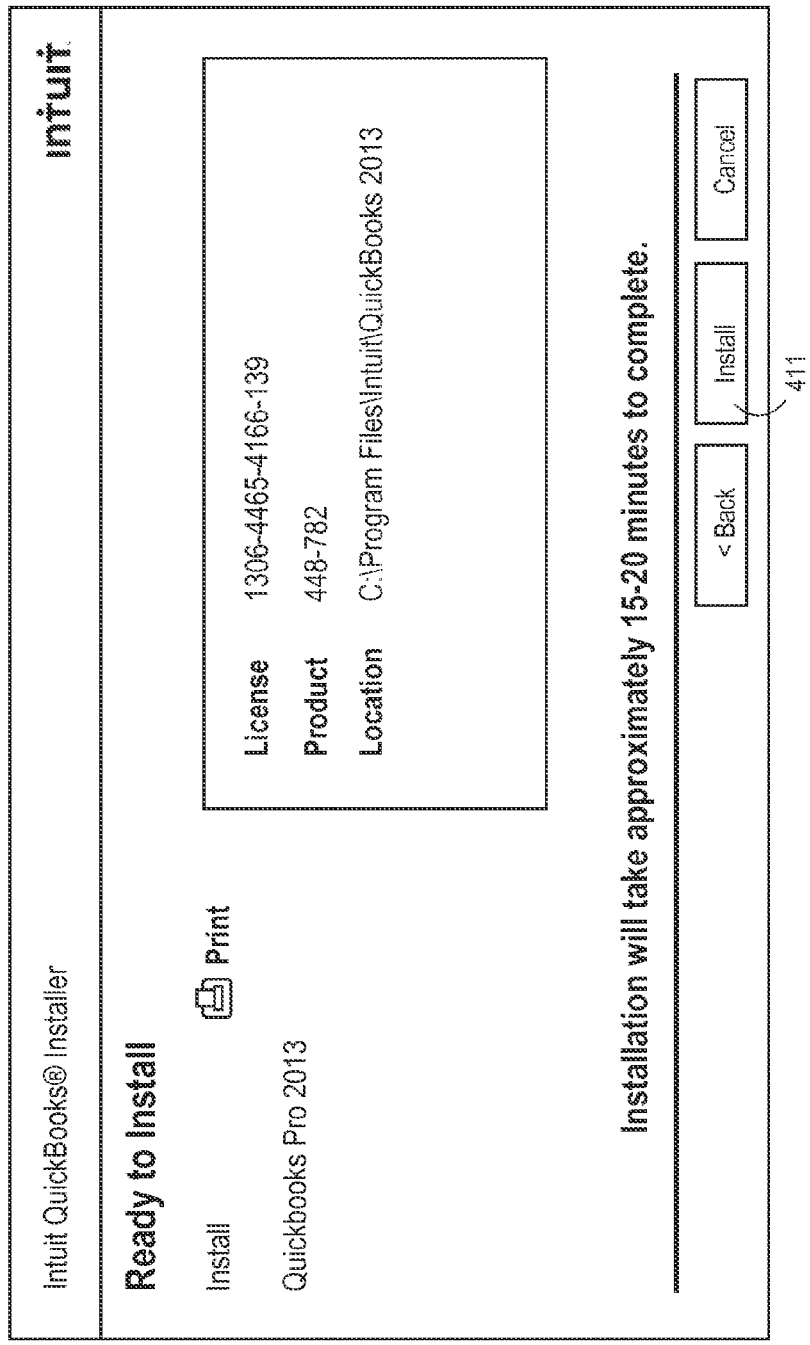
Figure 4D:
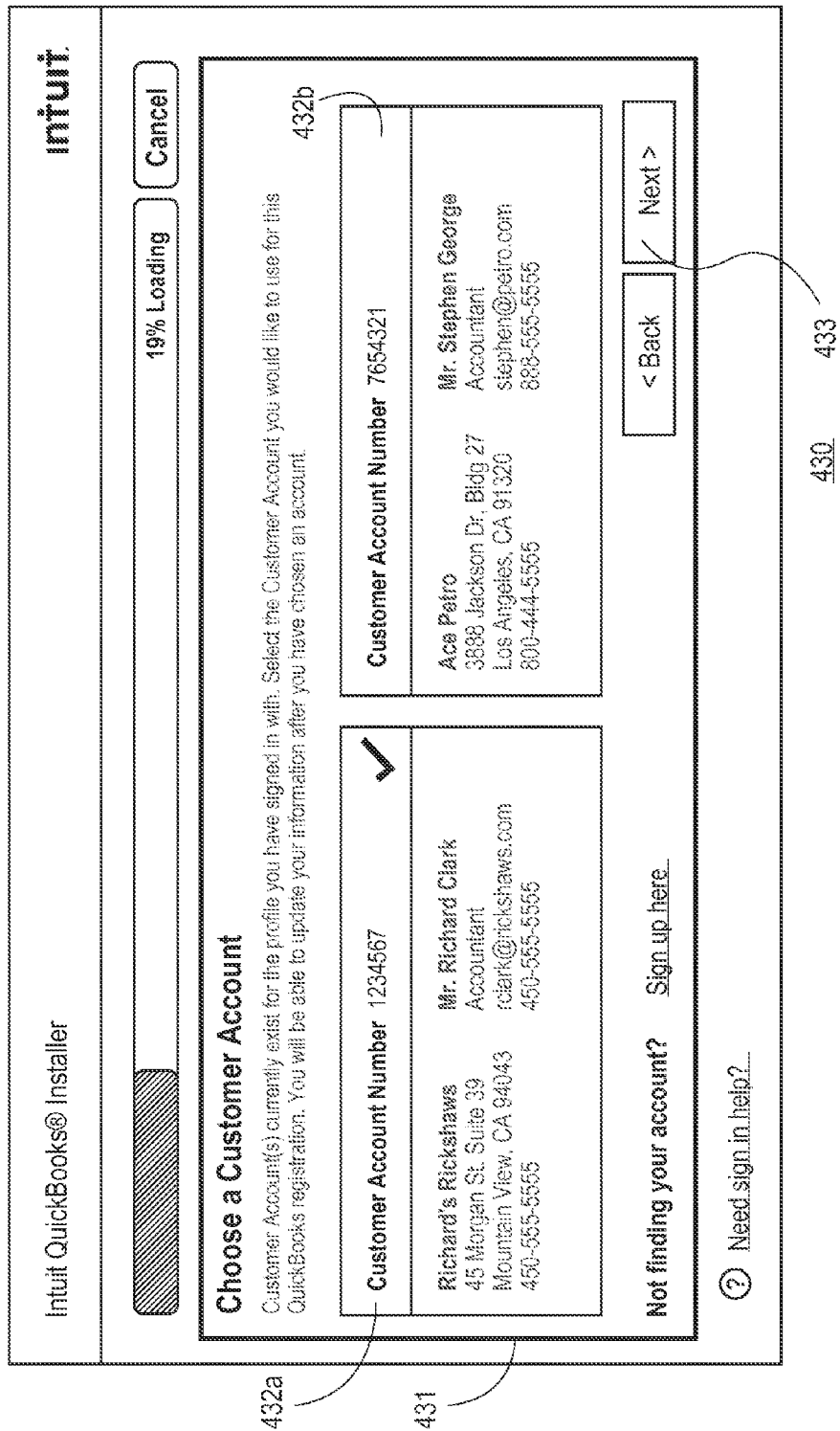
Figure 4F:
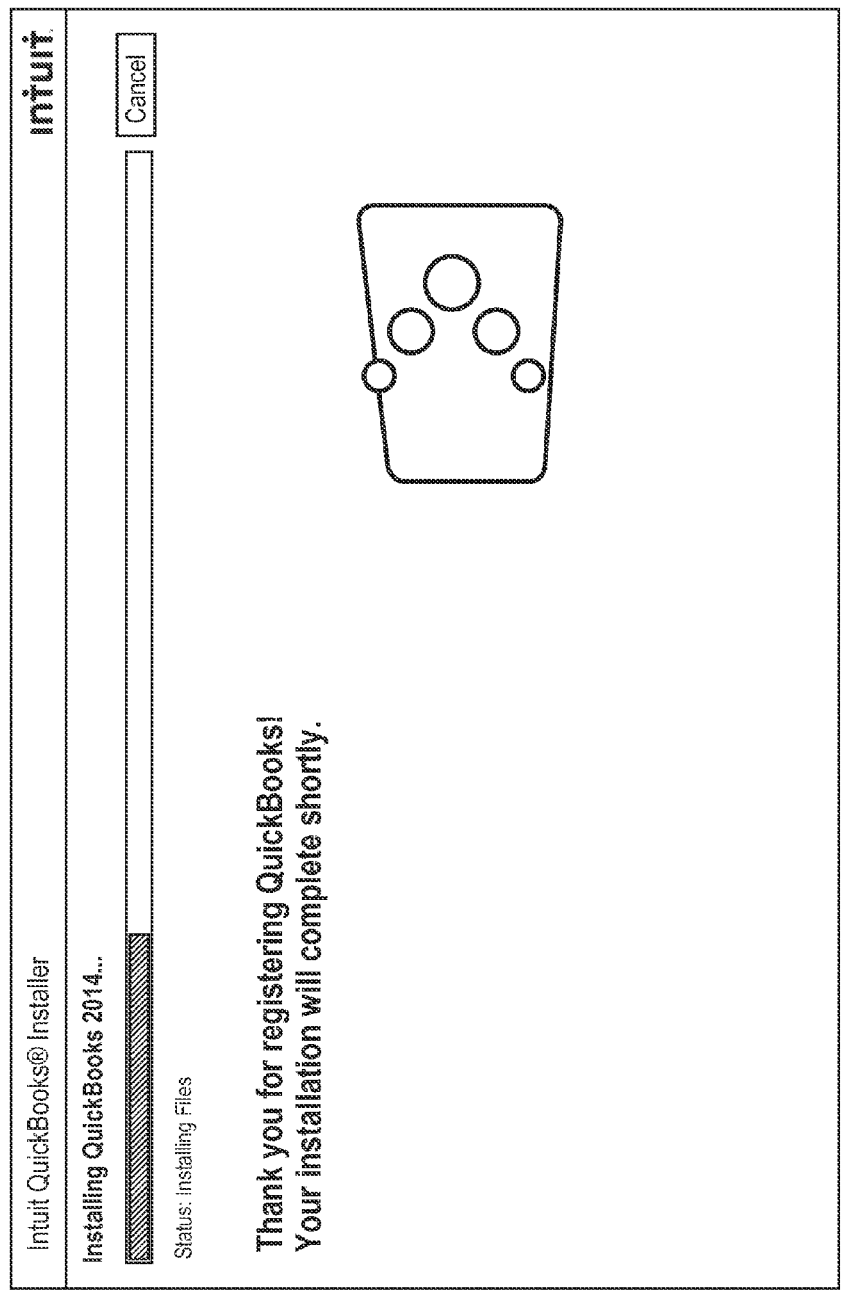

FIGS. 4A-4F show a sequence of six exemplary screen shots (400, 410, 420, 430, 440, and 450) for the disclosed system and method for data collection and/or software registration during desktop software installation, where the IAM number is associated with multiple customer account numbers (CANs), in accordance with at least one embodiment. In FIG. 4A, a web screen (i.e. screen shot (400)) is shown to first prompt the user to enter the software license number 401 and the software product number 402 for the software program to be installed onto the user's computer. After the user enters the software license number 401 and the software product number 402 and presses the "next" button 403, a web screen (i.e. screen shot (410) of FIG. 4B)

prompts the user to push the "install" confirmation button 411 to begin the installation of the software program onto the user's computer.

After the user pushes the "install" confirmation button 411, the software installation process begins and a web form 421 embedded within the installer web screen (i.e. screen shot (420) of FIG. 4C) prompts the user to enter their user identification (ID) 422 and their associated password 423. After the user enters their user ID 422 and their password 423 and pushes the "sign in" button 424, a web form 431 embedded within the installer web screen (i.e. screen shot (430) of FIG. 4D) prompts the user to select one customer account number (CAN) 432 to use from a listing of multiple CANs 432*a*, 432*b* that are associated with the user IAM number (i.e. the IAM number associated with the user ID 422 and the user password 423).

Once the user selects the CAN 432*a* to use and presses the "next" button 433, a web form 441 embedded within the installer web screen (i.e. screen shot (440) of FIG. 4E) prompts the user to enter various data 442 required to register the software program. After the registration process is complete, the installation process continues (i.e. screen shot (450) of FIG. 4F) until it is complete. After the installation process is complete, the registration data 442 the user entered during the installation process is saved to the user's online profile and/or imported to other data files.

Figure 5:
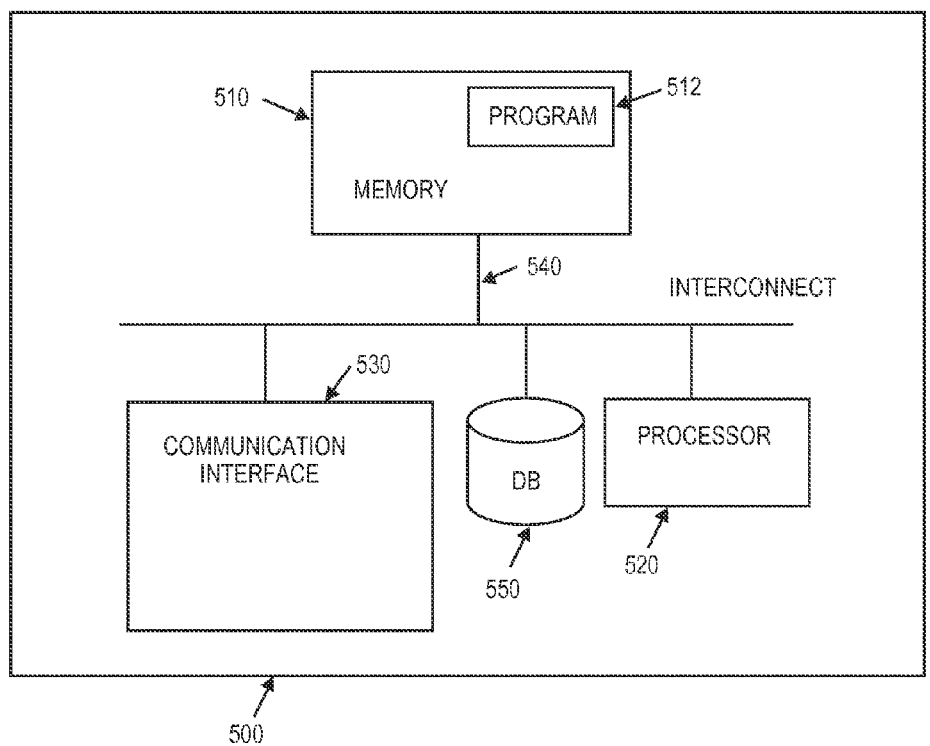
FIG. 5 is a block diagram of components of a computing device, apparatus, or system in which various embodiments may be implemented or that may be utilized to execute embodiments.

FIG. 5 generally illustrates components of a computing device 500 that may be utilized to execute embodiments and that includes a memory 510, matching application instructions 512, a processor or controller 520 to execute the matching application instructions 512, a database 550 for storing data, a network or communications interface 530, e.g., for communications with a network or interconnect 540 between such components. The memory 510 may be or include one or more of cache, RAM, ROM, SRAM, DRAM, RDRAM, EEPROM and other types of volatile or non-volatile memory capable of storing data. The processor unit 520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 540 may include a system bus, LDT, PCI, ISA, or other types of buses, and the communications or network interface may, for example, be an Ethernet interface, a Frame Relay interface, or other interface. The network interface 530 may be configured to enable a system component to communicate with other system components across a network which may be a wireless or various other networks. It should be noted that one or more components of computing device 500 may be located remotely and accessed via a network. Accordingly, the system configuration provided in FIG. 5 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 520 executes program instructions 512 within memory 510 and/or embodied on the carrier to implement method embodiments. Further, embodiments may reside and execute on a mobile communication device such as a cellular telephone or smartphone.

Figure 6:
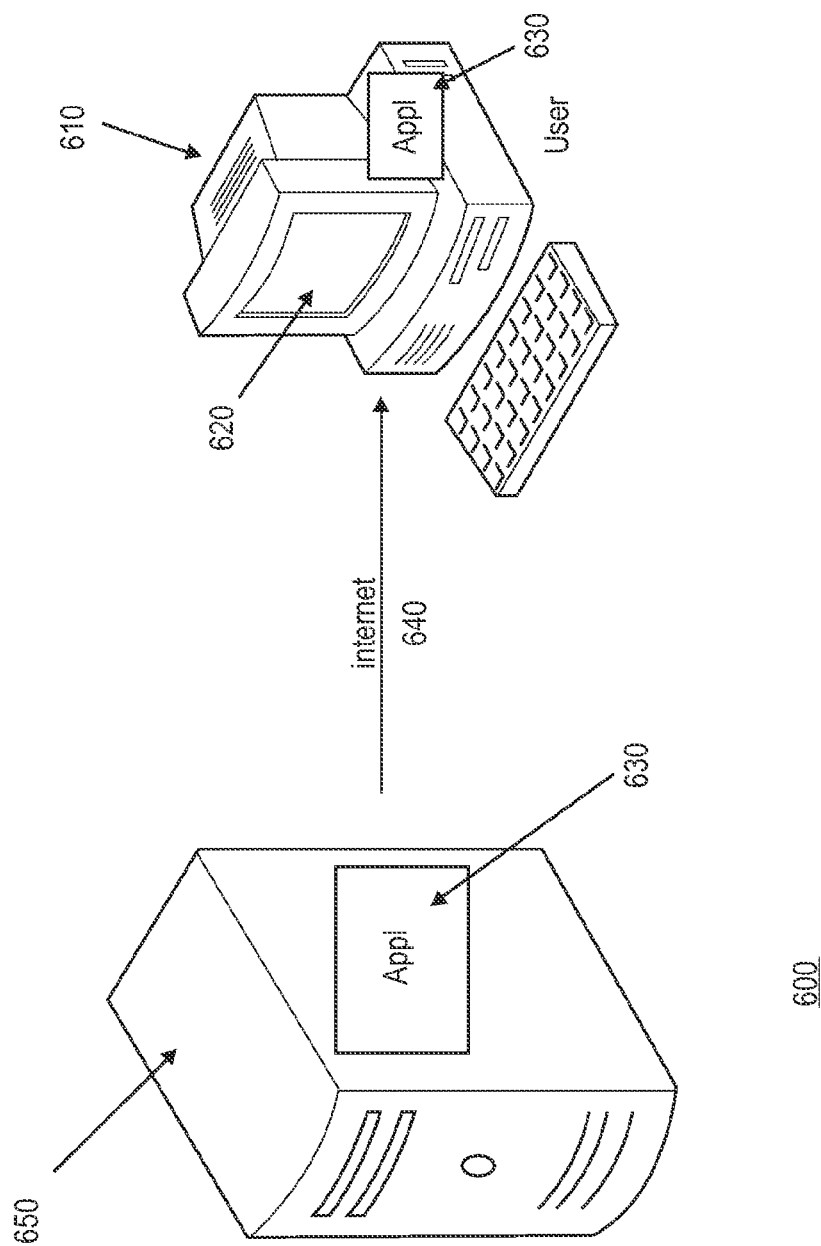
FIG. 6 shows a schematic diagram depicting an exemplary computing device downloading the installation program from a remote computing device, in accordance with at least one embodiment.

FIG. 6 shows a schematic diagram 600 depicting an exemplary computing devices 610 downloading at least one application 630 from a remote computing device 650, in accordance with at least one embodiment. In this figure, the computing device 610 is shown to include a display 620, which is used to present the screen shots shown in FIGS. 1A-1G, 3A-3F, and 4A-4F to the user. The computing device 610 is also shown to be downloading, via the internet 640, at least one application 630 from a remote computing device (e.g., a server) 650. The application(s) 630 is to be executed on the computing device 610. The application(s) 630 may include the installation program, the software program, and the program for data collection/software registration during the installation process.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with products in the form of computer program products embodied in a non-transitory computer readable medium such as a software product, embodiments may also involve products in the form of tangible goods or services that are consumed by individuals and corporate and government entities.

As a further example, embodiments may involve a software program that is a stand alone application, which may contain one or more programs (e.g., the software program may contain the installation program for the installation process of the software program and/or may contain the program for data collection and/or software registration during the installation process), or that is part of another system or program.

As another example, embodiments may involve an installation program, which is performed for the installation process of the software program, that is a stand alone application, which may contain one or more programs (e.g., the installation program may contain the program for data collection and/or software registration during the installation process), or that is part of another system or program (e.g., the installation program may be a part of the software program).

As yet another example, embodiments may involve a program for data collection and/or software registration during the installation process that is a stand alone application, which may contain one or more programs, or that is part of another system or program (e.g., the program for data collection and/or software registration during the installation process may be a part of the installation program and/or may be a part of the software program).

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

What is claimed is:

1. A computer-implemented method for at least one of data collection and software registration during software installation, the method comprising:
   presenting, by a computer, at least one web screen to a user through a display;
   during a software installation process of a software program, displaying a web form embedded into a web screen of the at least one web screen;
   receiving, by the computer, input data from the user via the web form as the software installation process of the software program is progressing, such that the software installation process is not delayed by the input of the data from the user; and
   providing, by the computer, the input data to the software program after the installation process is complete.

2. The method of claim 1, wherein the web screen is an installation web screen for the software installation process.

3. The method of claim 1, further comprising downloading, onto the computer, the software program.

4. The method of claim 1, wherein the at least one web screen further comprises an installation confirmation web screen, the method further comprising receiving, by the computer, at least one of a license number for the software program and a product number for the software program via the installation confirmation web screen.

5. The method of claim 4, wherein the at least one of a license number for the software program and a product number for the software program is a license number for the software program.

6. The method of claim 4, wherein the at least one of a license number for the software program and a product number for the software program is a product number for the software program.

7. The method of claim 1, further comprising requesting, by the computer from the user, a username and password for the user via one of the at least one web screen.

8. The method of claim 1, further comprising receiving, by the computer from the user, a username and password for the user via one of the at least one web screen.

9. The method of claim 1, further comprising requesting, by the computer from the user, a command to start the software installation process for the software program via one of the at least one web screen.

10. The method of claim 1, further comprising receiving, by the computer from the user, a command to start the software installation process for the software program via one of the at least one web screen.

11. The method of claim 1, wherein the input data from the user is at least one of user identification data, customer information data, software registration data, software configuration data, and answers by the user to at least one survey.

12. The method of claim 1, wherein the computer is one of a desktop computer, a laptop computer, a tablet, and a smart phone.

13. A computer program product comprising a non-transitory computer readable storage medium embodying one or more instructions executable by a computing device to perform a process for at least one of data collection and software registration during software installation, the process comprising:
   presenting, by the computing device, at least one web screen to a user through a display;
   during a software installation process of a software program, displaying a web form embedded into a web screen of the at least one web screen;
   receiving, by the computing device, input data from the user via the web form as the software installation process of the software program is progressing, such that the software installation process is not delayed by the input of the data from the user; and
   providing, by the computing device, the input data to the software program after the installation process is complete.

14. The computer program product of claim 13, wherein the web screen is an installation web screen for the software installation process.

15. The computer program product of claim 13, wherein the process further comprises downloading, onto the computing device, the software program.

16. The computer program product of claim 13, wherein the at least one web screen further comprises an installation confirmation web screen, the process further comprises receiving, by the computing device, at least one of a license number for the software program and a product number for the software program via the installation confirmation web screen.

17. The computer program product of claim 16, wherein the at least one of a license number for the software program and a product number for the software program is a license number for the software program.

18. The computer program product of claim 16, wherein the at least one of a license number for the software program and a product number for the software program is a product number for the software program.

19. The computer program product of claim 13, wherein the process further comprises requesting, by the computing device from the user, a username and password for the user via one of the at least one web screen.

20. The computer program product of claim 13, wherein the process further comprises receiving, by the computing device from the user, a username and password for the user via one of the at least one web screen.

21. The computer program product of claim 13, wherein the process further comprises requesting, by the computing device from the user, a command to start the software installation process for the software program via one of the at least one web screen.

22. The computer program product of claim 13, wherein the process further comprises receiving, by the computing device from the user, a command to start the software installation process for the software program via one of the at least one web screen.

23. The computer program product of claim 13, wherein the input data from the user is at least one of user identification data, customer information data, software registration data, software configuration data, and answers by the user to at least one survey.

24. The computer program product of claim 13, wherein the computing device is one of a desktop computer, a laptop computer, a tablet, and a smart phone.

25. A system for at least one of data collection and software registration during software installation, the system comprising:
- a computing device including a display; and
- an installation program executed by the computing device to install a software program onto the computing device, wherein, during the execution of the installation program, the computing device is to present at least one web screen to a user through the display, during a software installation process of the software program, presenting a web form embedded into a web screen of the at least one web screen, and receiving input data from the user via the web form as the execution of the installation program is progressing to install the software program onto the computing device, such that the software installation process is not delayed by the input of the data from the user;
- wherein the computing device is to provide the data inputted by the user to the software program, after the execution of the installation program is complete.

26. The system of claim 25, wherein the web screen is an installation web screen for the installation program.

27. The system of claim 25, wherein the computing device is further to download the software program onto the computing device.

28. The system of claim 25, wherein the at least one web screen further comprises an installation confirmation web screen, wherein the computing device is further to receive at least one of a license number for the software program and a product number for the software program via the installation confirmation web screen.

29. The system of claim 28, wherein the at least one of a license number for the software program and a product number for the software program is a license number for the software program.

30. The system of claim 28, wherein the at least one of a license number for the software program and a product number for the software program is a product number for the software program.

31. The system of claim 25, wherein the computing device is further to request a username and password for the user via one of the at least one web screen.

32. The system of claim 25, wherein the computing device is further to receive from the user a username and the password for the user via one of the at least one web screen.

33. The system of claim 25, wherein the computing device is further to request a command to start the execution of the installation program via one of the at least one web screen.

34. The system of claim 25, wherein the computing device is further to receive from the user a command to start the execution of the installation program via one of the at least one web screen.

35. The system of claim 25, wherein the input data from the user is at least one of user identification data, customer information data, software registration data, software configuration data, and answers by the user to at least one survey.

36. The system of claim 25, wherein the computing device is one of a desktop computer, a laptop computer, a tablet, and a smart phone.

37. A computer-implemented method for software registration during software installation, the method comprising:
- presenting, by a computer, at least one web screen to a user through a display;
- during a software installation process for installing a software program on the computer, displaying a web form embedded into a web screen of the at least one web screen;
- receiving, by the computer, software registration data inputted from the user via the web form as the installation of the software program on the computer is progressing, such that the software installation process is not delayed by the input of the software registration data from the user; and
- providing, by the computer, the software registration data inputted by the user to the software program after the installation process is complete.

* * * * *